United States Patent
Garg et al.

(10) Patent No.: US 6,289,458 B1
(45) Date of Patent: Sep. 11, 2001

(54) PER PROPERTY ACCESS CONTROL MECHANISM

(75) Inventors: Praerit Garg, Kirkland; Michael M. Swift, Seattle; Clifford P. Van Dyke, Bellevue; Richard B. Ward, Redmond; Peter T. Brundrett, Seattle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/157,771

(22) Filed: Sep. 21, 1998

(51) Int. Cl.[7] ...................................................... G96F 12/14
(52) U.S. Cl. ............................................................ 713/200
(58) Field of Search ..................... 713/200, 201, 713/202, 159, 164, 166, 167, 172; 709/225, 229

(56) References Cited

U.S. PATENT DOCUMENTS 5,675,782 * 10/1997 Montague et al. .................... 395/609
6,029,246 * 2/2000 Bahr ..................................... 713/200

* cited by examiner

*Primary Examiner*—James P. Trammell
*Assistant Examiner*—Pierre E. Elisca
(74) *Attorney, Agent, or Firm*—Lee & Hayes, PLLC (57) ABSTRACT

Providing access control to individual properties of an object is described. In one embodiment, a computer system comprises an operating system operative to control applications and services running on the system. The service maintains a service object having at least one property. Also included in the system is an access control module within the operating system. The access control module includes an access control interface operative to control access to a property of the object.

33 Claims, 5 Drawing Sheets

PER PROPERTY ACCESS CONTROL MECHANISM

This application is related to the following applications, all of which were filed on Sep. 21, 1998, and assigned to the same assignee as the present application: "Object Type Specific Access Control Mechanism", Ser. No. 09/157,768, and "Extensible Access Control Rights Mechanism", Ser. No. 09/157,882.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1998, Microsoft Corporation, All Rights Reserved.

FIELD

This invention relates generally to software access control, and more particularly to providing access control on a per property basis.

BACKGROUND

Multi-user computer systems and systems connected to a multi-user network of computers require the ability to control and restrict access to various components and services provided within the computer system. Windows NT® is an operating system available from Microsoft Corporation, Redmond Washington, and is an example of a multi-user system implementing access control. Several reasons exist for providing access control, however primary reasons are to protect the privacy of each user's data, and to protect system data from intentional or inadvertent corruption causing system failure or inefficient operation.

Examples of the components typically requiring an access control mechanism include file systems, electronic mail (E-mail) services, directory services, and database systems. Each of these services is typically managed by a separate program within the operating system, and each typically provides its own access control mechanism.

Each of these components is generally represented by objects having a plurality of properties describing various aspects of the object. For example, a file system, as is known in the art, is typically comprised of a set of folders organized in a tree structure. The folders contain files. Objects representing folders and files typically have properties such as the creation date and time, the last modification date and time, the last access date and time, the file size, an indicator of who owns the file or folder and multiple data streams associated with the file.

Another example is a directory service. Directory services maintain a database of objects describing various resources available on the computer system. The Active Directory™ system available from Microsoft Corporation, Redmond Washington provides such a service. Directory services typically need to maintain a variety of objects to represent the various types of resources available on modem computer systems. One example of such an object represents a system user. A user object in the directory service will typically be defined by properties comprising the user's name, E-mail address, company postal address, physical office location, telephone number, and the user's password in encrypted form. The list provided is meant to be representative of the types of properties, and does not necessarily include all the properties of a directory entry.

Typically, there are several major concepts common to access control systems provided by prior systems. The first concept is that users of the system are assigned a user identifier (USERID). The USERID uniquely identifies a user to the system. The USERID is used to control and track access to the various components of the computer system. The USERID is generally associated with a password, which must be correctly supplied before a user is allowed access to the system.

In addition to the USERID, some operating systems, including Windows NT®, also support the concept of a group identifier (GROUPID). A group identifier allows the system to treat a related group of users in a similar way. For example, there may be a group of users assigned to a backup group whose function is to provide daily backups of the data contained within the computer system. Since the members of this group would all need similar system permissions, it is easier and more convenient to include them in a user group and assign the permissions to the group, rather than to each individual within the group.

The second concept supported by access control systems is the concept of access rights associated with an object. Access rights define who is allowed to manipulate an object. In the context of a file system, access rights associated with files include the right to create a file, read a file, write a file, update a file, and delete a file. In the context of a directory service, access rights associated with directory entries include the right to create an entry, read an entry, update an entry, and delete an entry. Access rights are also referred to as access control rights, or permissions.

Access rights are typically granted or denied based on the USERID or GROUPID associated with an application making a service request.

A primary problem with the above-described mechanism is that the rights are associated with the whole object. In other words, the same permission applies to each and every property defined in the object. For example, a user having write attribute permission for a file, can also update the creation, modification and access times associated with the file.

The problem is more acute with a directory service. Directory entries typically contain a number of properties with varying purposes. As a result, many different sets of users need to read and write the properties. For example, a building receptionist may be interested in updating the telephone number and office address properties of an employee's directory entry, while a system administrator may be interested in maintaining the E-mail and password properties within the same employee's directory entry. In prior systems, both the receptionist and the system administrator would need to be granted write access to the object's entire set of properties in order to perform their respective functions. This leads to the potentially undesirable result of the receptionist having the ability to update the user's password and the system administrator inadvertently updating the user's telephone number.

A secondary problem with the access control mechanisms of prior systems is the fact that each service provides its own access control mechanism. For example, the file system service, directory service, E-mail service, and database service each provide its own access control methods and procedures. This leads to inconsistencies between the services, and also to redundant code.

Therefore, there is a need in the art for an access control system that provides a mechanism for defining a higher granularity of access control rights for a service. The system should support previous mechanisms where the access rights apply to the entire object. In addition, the system provides a consistent, non-redundant interface.

SUMMARY

The above-identified problems, shortcomings and disadvantages with the prior art, as well as other problems, shortcoming and disadvantages, are solved by the present invention, which will be understood by reading and studying the specification and the drawings. In one configuration, a computer system comprises an operating system operative to control applications and services running on the system. The service maintains a service object having at least one property. Also included in the system is an access control module within the operating system. The access control module includes an access control interface operative to control access to a property of the object.

One aspect of the invention is that service modules providing object management functions for varying types of objects can define separate access control rights for each individual property within an object using the data structures defined by the invention. The data structures and methods of the invention allow a user to both grant and deny multiple types of access permissions to both individual users and groups of users. In addition, sets of related properties can be assigned similar access permissions.

One of the data structures defined in the invention includes fields defining whether access is being granted or denied, and the type of access to grant or deny. The data structure also defines the user or group to whom the permission is granted or denied. Finally, the data structure includes an identifier used to indicate a specific object, property or set of properties to which the permissions apply.

A second data structure defined in the invention allows groups of related properties to be included in a set. The data structure is implemented as a graph structure, with the root of the graph identifying an object type. Lower level nodes in the graph describe the sets to which properties of the object belong.

Thus, the invention provides advantages not found in prior systems. System users can grant and deny access to individual properties or sets of properties to particular users and groups of users. This allows rights to be granted in a more flexible and appropriate manner than in previous systems in which the same access rights had to be applied to each property in the object. Furthermore, the invention provides a consistent interface to service modules, thereby making it easier to develop software incorporating access control rights. Additionally, administration and training tasks are easier due to the consistent interface provided by the invention.

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system of one embodiment of the invention is presented. In the third section, a method, in accordance with an embodiment of the invention, is provided. Finally, in the fourth section, a conclusion of the detailed description is provided.

Hardware and Operating Environment

Figure 1:
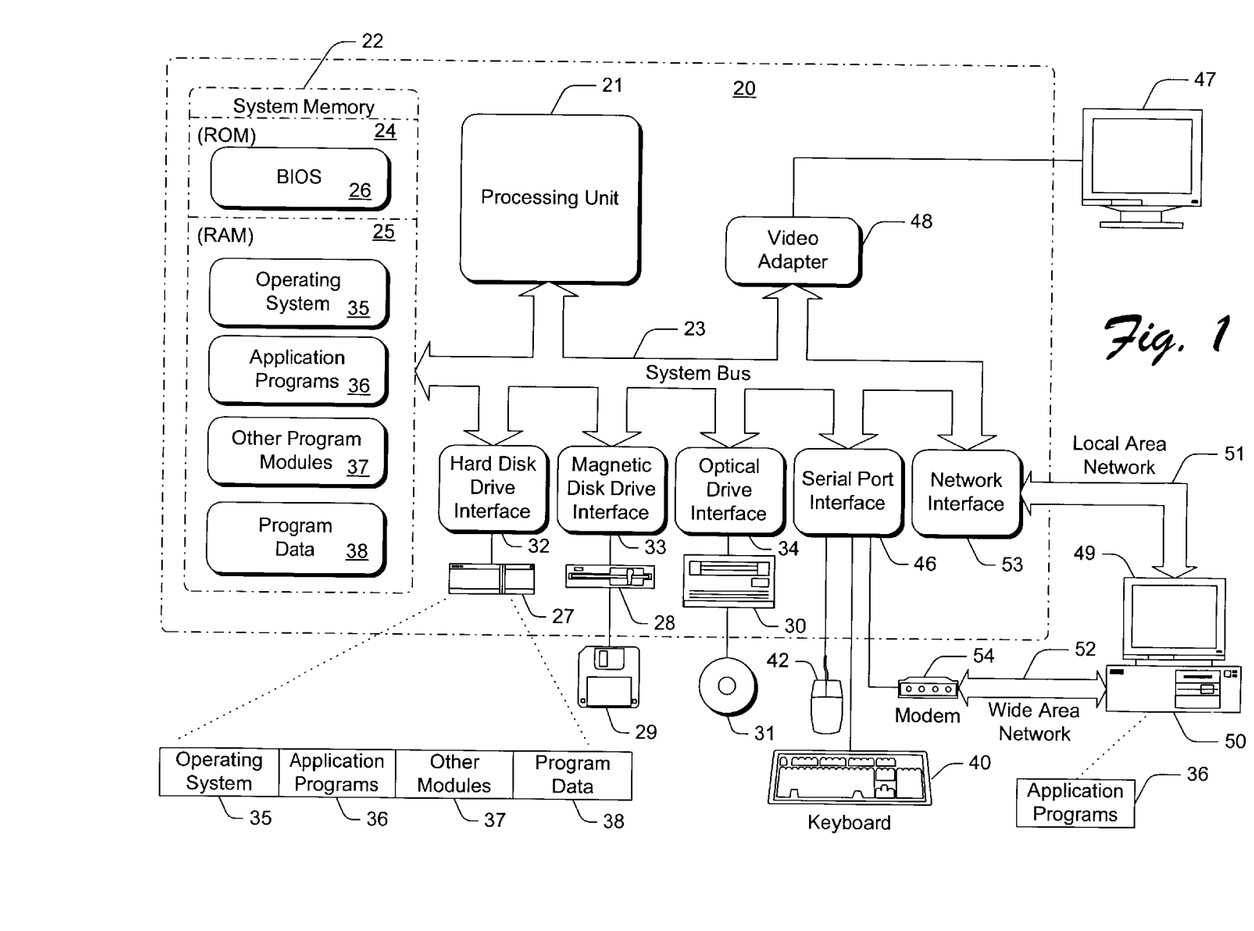
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples the various system components, including system memory 22 to processing unit 21. There can be one or more of processing unit 21, such that computer 20 has a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections t o one or more remote computers, such as remote computer 49. Th ese logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System

In this section of the detailed description, a description of a computerized system according to an embodiment of the invention is provided. The description is provided by reference to FIG. 2 which shows a block diagram of various major components of a system of the invention, and FIGS. 3(a), 3(b) and 3(c) which show details of data structures used by the system. The detailed description of the system presented in this section concludes with a description of how the components and data structures operate together to provide access control on a per property basis.

Figure 2:
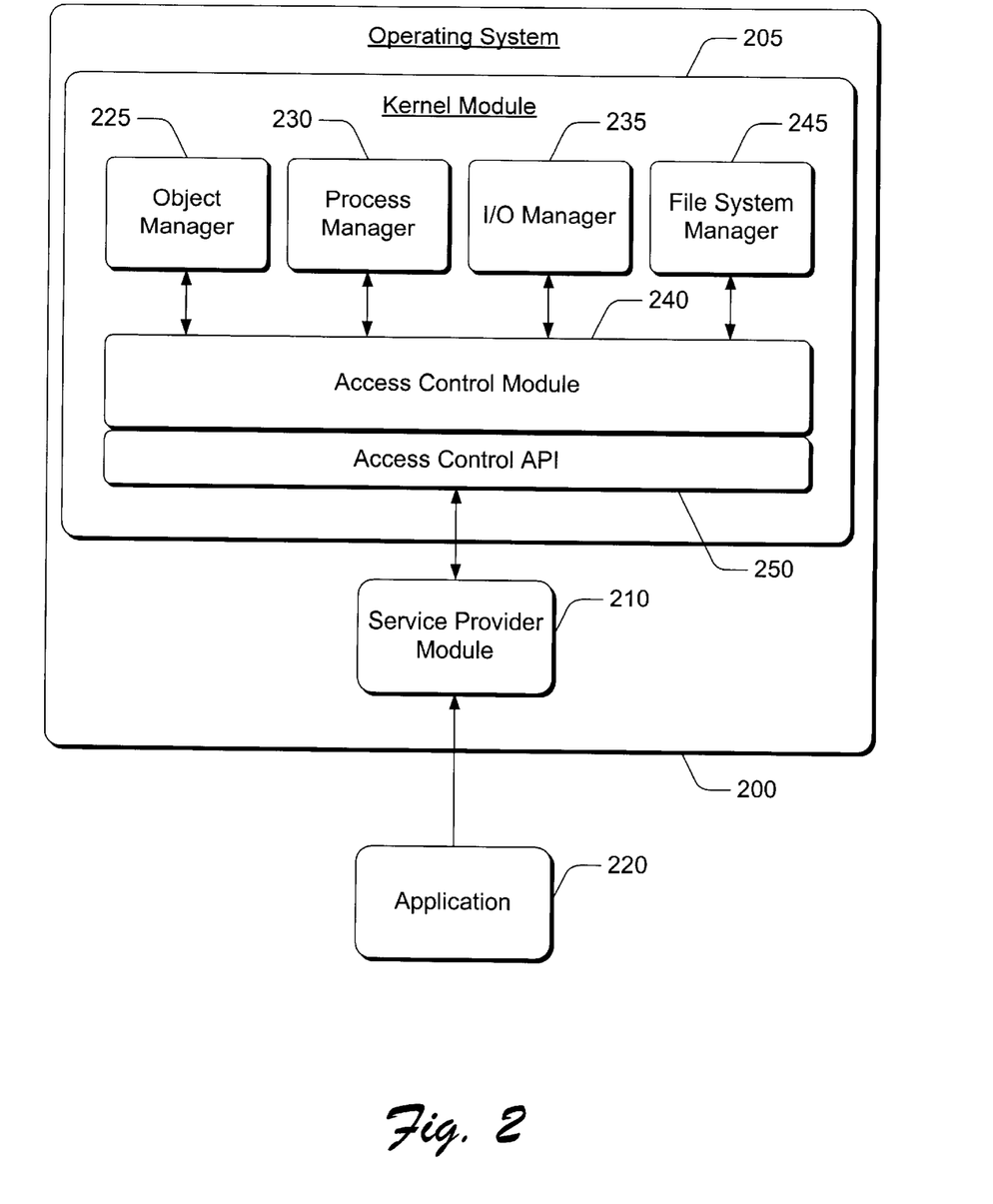
FIG. 2 shows a block diagram of a system according to one embodiment of the invention.

In FIG. 2, a system according to an embodiment of the invention includes an operating system 200 and application 220. As shown, the operating system 200 includes a kernel module 205 and a service module 210. Those skilled in the art will recognize that other components of operating systems exist. Only those components necessary to provide an enabling description of the invention have been provided.

Kernel module 205 provides the core components of operating system 200. Included in kernel module 205 are an object manager 225, a process manager 230, an input/output (IO) manager 235, a file system manager 245, and an access control module 240. These core components provide the basic services required to control the execution of various applications like application 220, and also to manage the devices attached to the computer system. Because of the specialized processing performed by the kernel and its modules, it is desirable for the kernel components to run at a higher priority and in a protected memory area. Those of ordinary skill within the art will appreciate that the operating system 200 also may include other components, not shown in FIG. 2; only those parts necessary to describe the invention in an enabling manner are provided.

Object manager 225 maintains and manages objects defined within the system. Objects have properties that are typically used to describe various aspects of the components of the system. Many different types of objects may exist in the system, and, in one embodiment of the invention, each object is assigned two unique identifiers known as a Globally Unique Identifier (GUID) to distinguish it from the other objects. GUIDs are 128 bit numbers that are guaranteed not to be re-used by another application. The first identifier is the Object Type GUID, which identifies the particular type of object being managed by the object manager. The second identifier is the Object GUID, which uniquely identifies the particular object within a group of objects of the same type.

Process manager 230 controls the execution of processes within the system. A process is typically thought of as an instance of an executable computer program. A process typically has a priority assigned to it, and may require resources from several components of the operating system. In addition, processes typically have the USERID of the user invoking the process associated with them. Process manager 230 controls the execution of the potentially many different processes competing for system resources and processing time.

IO manager 235 controls input and output to the various devices connected to the computer system. These devices include disk drives (both fixed and removable), network interfaces, communications interfaces (both serial and parallel), and display devices.

File system manager 245 maintains and coordinates access to the file system. The file system manager arbitrates access to files by processes, and maintains the data structures describing the structure and organization of the files and folders comprising the file system.

Access control module 240 provides a centralized, standard mechanism to evaluate whether or not various requests for operations affecting objects should be granted or denied. In one embodiment of the invention, access control module 240 is known as a "Security Reference Monitor" and is a kernel module of the Windows NT® operating system. The access control module defines an access check application programming interface (API) 250 for various components to submit access check requests, and to communicate results back to the requester. Access control module 240 applies the method described in the next section of the detailed specification to the data structures described below in reference to FIGS. 3(a), 3(b), and 3(c) to evaluate the requests.

Service module 210 is a process or thread that provides one of a variety of services to various applications running on the system. In one embodiment of the invention, service module 210 is a directory service. In an alternative embodiment of the invention, service module 210 is a database engine. Those of ordinary skill in the art will recognize that other service modules exist on various operating systems and can be adapted to the system of the invention.

Application 220 in the block diagram represents a typical application running under the control of the process manager 230 of operating system 200. Typically, application 220 requires the services of the object manager 225, the file system manager 245, and various service modules 210 during its execution.

The various components described above have been shown and described as residing on a single computer system, however, the invention is not so limited. For example, the directory service could reside on a separate computer system from the application using the directory service, with the two systems communicatively connected by a network. The same is true for other components of the system, as those of ordinary skill in the art will recognize.

Figures 3A, 3B:
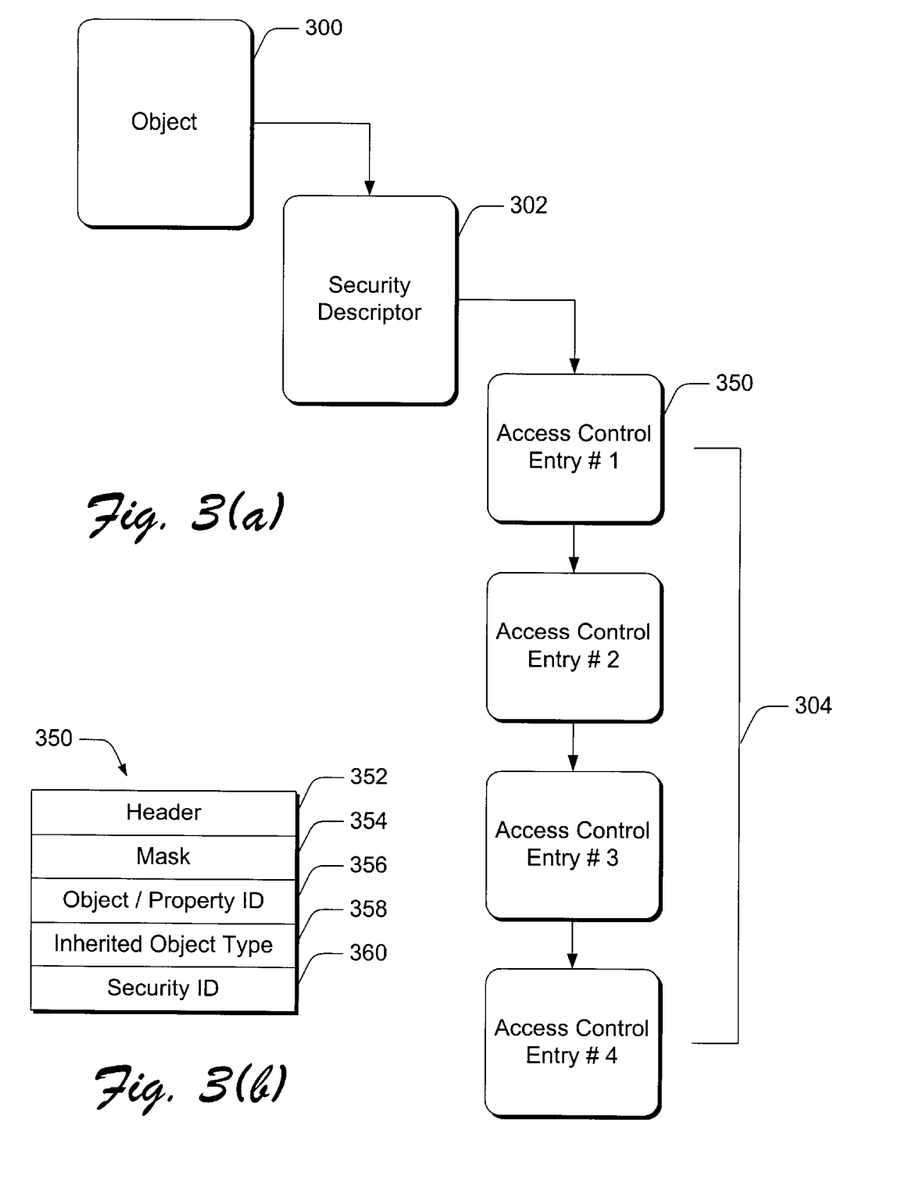
FIGS. 3(a), 3(b) and 3(c) show data structures used within a system according to one embodiment of the invention.

A description of the data structures used within a system of the invention will now be presented. FIG. 3(a) provides a graphical description of the relationships between the various major data structures used by the system, including object 300, security descriptor 302 and access control entries 304.

Object 300 is a data structure describing an object managed by object manager 225. Object 300 can be any one of a number of different object types supported by the operating system and services running under the operating system. Object 300 comprises various properties, some of which are common to all objects, and others which are application or service specific. The common properties include an object type identifier, an object identifier, and a reference to a security descriptor 302. In one embodiment of the invention, the identifiers are Globally Unique Identifiers (GUIDs). Application or service specific properties vary depending on the application's or service's purpose and function. For example, an object defined by the file system service can include properties such as the USERID of the owner of the file, the file creation time, the file modification time, the file access time, and data stream descriptors. Alternatively, a "user" object defined by a directory service can include the user's name, E-mail address, office telephone number, office location, and password. Properties within an object also have unique identifiers associated with them. In one embodiment of the invention, the identifiers are GUIDs.

Security descriptor 302 provides details on the security and access control applicable to object 300. Security descriptor 302 contains various properties, including the owner security identifier and an access control list 304 of access control entries 350. The owner security identifier indicates who "owns" the object, i.e., who is responsible for maintaining the object. Typically, the owner security identifier is the USERID of the person running an application that created the object. The access control list 304 contains zero or more access control entries 350, which define the access control applied to the object 300. Each entry in the list defines a set of permissions to be applied to a particular USERID or GROUPID with respect to either the object 300 as a whole, or individual properties of object 300. Desirably, the order of entries in the access control list 304 is significant, with entries appearing first in the list taking precedence over conflicting entries, if any, appearing later in the list. For example, if an entry granting write access to a particular property appears before an entry denying access to the same property, the permission will be granted.

The access control entry 350 referred to above is the basic building block used to provide access control to various objects. In FIG. 3(b), a detailed view of an access control entry 350 is presented. In one embodiment of the invention, access control entry 350 comprises header 352, mask 354, object type identifier 356, inherited object type 358, and security id 360.

Header 352 defines the type of access control entry. The value in header 352 indicates whether the entry will grant a set of permissions or deny a set of permissions. In addition, header 352 also contains flags that indicate inheritance for the access control entry to objects contained in a container type object on which the access control entry is specified. The inheritance mechanism is described in more particularity in the copending, cofiled, and coassigned application entitled "Object Type Specific Access Control Mechanism" previously incorporated by reference.

Mask 354 is a bit mask, with each bit defining a particular permission to be granted or denied as indicated by header 352. In one embodiment of the invention, mask 354 is a bit mask containing 32 bits. In a further embodiment of the invention, 16 bits are reserved for operating system defined general permissions applicable to all objects, and 16 bits are used for object specific permissions that can vary based on the object type. Examples of permissions indicated by individual bits or groups of bits in the bit mask are read property and write property. Read property indicates that the ability to read the value of a property in object 300 should either be granted or denied, while write property indicates that the ability to update a property in object 300 should either be granted or denied. Additional permissions include read file, create file, write file, and delete file. Those of ordinary skill in the art will recognize that multiple permissions are possible, and that the examples shown above are not exhaustive.

Object type identifier 356 defines how the permissions in the bit mask are to be applied. In one embodiment of the invention, if the object type identifier 356 contains an identifier for a specific property, then the permissions defined in the bit mask apply only to that specific property of object 300. If object type identifier 356 contains no identifier, then the permissions in the bit mask apply to each and every application specific property in object 300.

Desirably, inherited object type identifier 358 is used to control how the access control entry is propagated to objects in the container on which the access control entry is defined. The inherited object type identifier 358 specifies the type of objects to which the access control entry should be propagated to. This allows the ability to define object specific permissions at higher levels in an object tree and to have them automatically inherited to appropriate objects within the tree. This simplifies administration of object specific access control and is described more particularly in the copending, cofiled, and coassigned application entitled "Object Type Specific Access Control Mechanism" previously incorporated by reference.

Security identifier 360 contains a value identifying either a USERID or GROUPID to whom the permissions apply. If the value is a USERID, then the permissions defined in mask 354 for the property defined in object type identifier 356 apply to that specific USERID. If the value is a GROUPID, then the permissions apply to each USERID that is a member of the group defined by the GROUPID.

In one embodiment of the invention, it is desirable to provide the ability to group the properties of object 300 into sets of related properties with common access control rights. For example, a user may wish to group the properties of a user object that are maintained by a system administrator into one set, and a group of properties maintained by a receptionist into another set. This reduces the number of access control entries that must be specified. A data structure to organize properties into related sets is provided in FIG. 3(c).

Figure 3C:
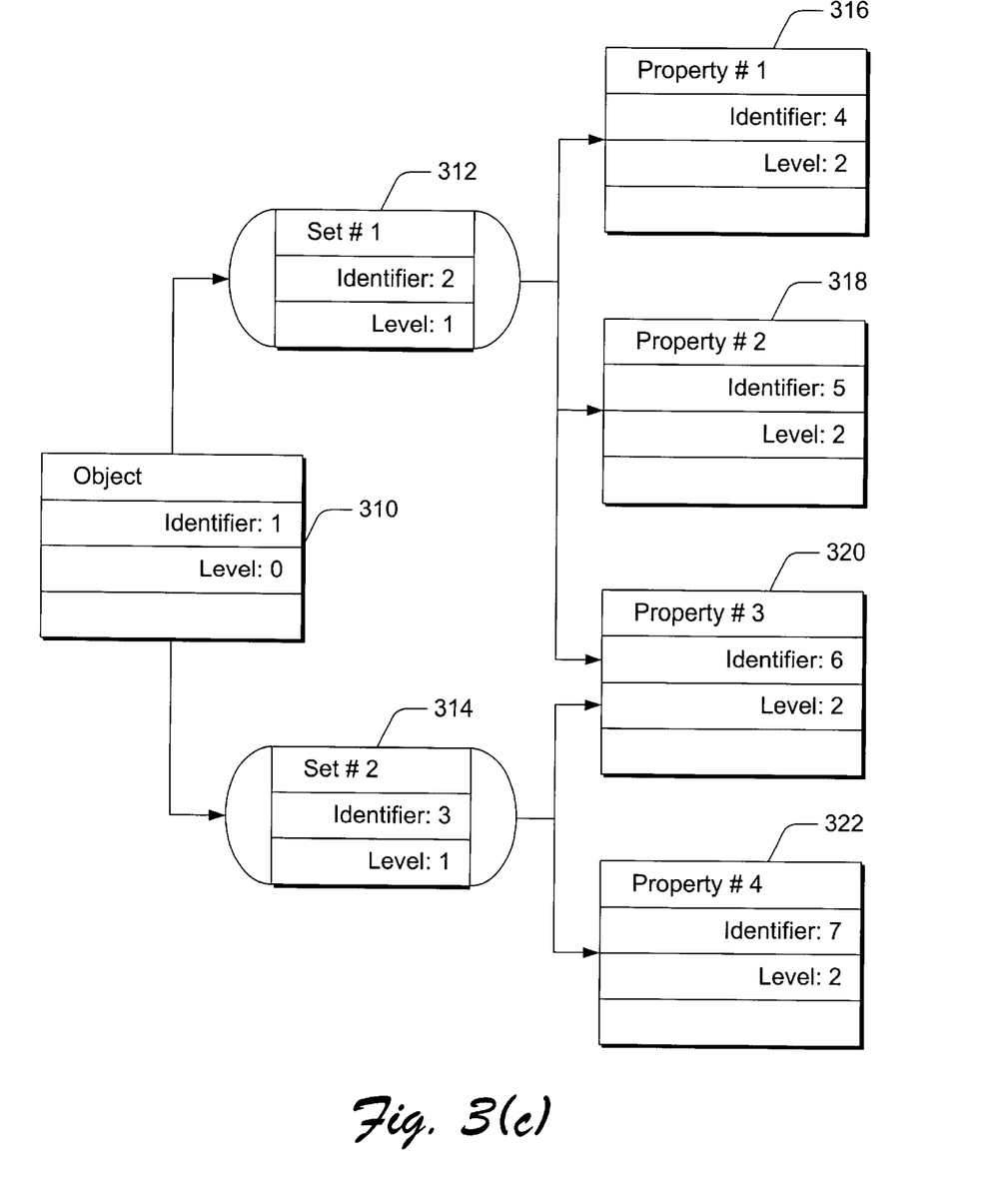

The data structure used to provide the ability to group properties of an object into related sets is the directed graph, an example of which is shown in FIG. 3(c). The root node 310 of the graph represents an object, and contains an object type identifier and a list of sets associated with the object. In this example, two sets of related properties are present, sets 312 and 314. Sets 312 and 314 contain a unique identifier, which in one embodiment of the invention is a GUID. In addition, sets 312 and 314 each maintain a list of the properties in the set. In this example, set 312 comprises properties 316, 318, and 320 while set 314 comprises properties 320 and 322. In addition to property entries, the set may also contain entries referring to other sets, thereby providing for multiple levels in the graph.

In one embodiment of the invention, a node in the graph is represented by a data structure including three elements. The structure is represented by the following C/C++ structure definition:

```
struct {
    USHORT Level;
    USHORT Sbz;
    GUID *ObjectType;
}
``` where:
Level indicates the level in the graph. In one embodiment, a value of zero indicates the root of the graph, a value of one indicates the first level below the root, and a value of two indicates the second level below the root;

Sbz is reserved for future expansion; and

ObjectType is a pointer to a GUID identifying a property or set comprising the node in the graph.

In one embodiment of the invention, an individual property may be a member of only one set, with the results that the data structure described above creates what is known in the art as a tree. However, the invention is not so limited, and in alternative embodiments, properties can be members of a plurality of sets, as shown in FIG. 3(c) where property 320 is a member of both sets 312 and 314.

Also, in an alternative embodiment of the invention, it is desirable to limit the depth of the graph to four levels, where a level includes the root object, any sets defined under the object, and any properties that are a part of a set, or contained in the object. For example, the graph shown in FIG. 3(c) defines a graph having 3 levels. The root object is at the first level, the sets are at the second level, and the properties belonging to the sets are in the third level. Limiting the number of levels provides for efficient use of memory and processing resources.

Thus, in accordance with one embodiment of the invention, the system of FIG. 2 operates as follows. Application 220 issues a request to service provider module 210. The request can be any one of a number of operations, including a request to read a property of an object defined and managed by service module 210. Before performing the requested operation, service module 210 issues a call to access control module 240 using a function defined by access control API 250. In one embodiment of the invention, the function receives as parameters an access token, a security descriptor, an object graph, and a desired access indicator. The access token identifies the USERID and any GROUPIDs that the user identified by USERID is a member of. The security descriptor parameter is the security descriptor for the object, and the object graph is a graph as described with reference to FIG. 3(c) indicating the set groupings of properties within the object. The desired access includes a bit mask of permission bits and indicates the type of access (e.g. read or write) that is desired.

The access control module 240 then examines each entry in the access control list provided by the security descriptor to determine if the desired access should be granted on one or more identifiers specified in the graph parameter. Details on the specific method used to determine if the desired access should be granted will be provided below in the Method section of the application. The API then returns an indication of the success or failure of the function call. Success indicates that the desired access was granted on all identifiers in the graph. Failure indicates that the desired access was denied on at least one of the identifiers in the graph. In one embodiment of the invention, two lists are also returned. The first list indicates which identifiers (object, property sets or properties) have been granted any type of access. The second list indicates the access that has been granted to the corresponding identifier in the first list.

Method

In this section of the detailed description, a method according to an embodiment of the invention is presented. This description is provided in reference to FIG. 4. The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer. Thus, in one embodiment, a computer program is executed by a processor of a computer from a medium therefrom to provide access control to various properties in objects defined within an operating system.

Figure 4:
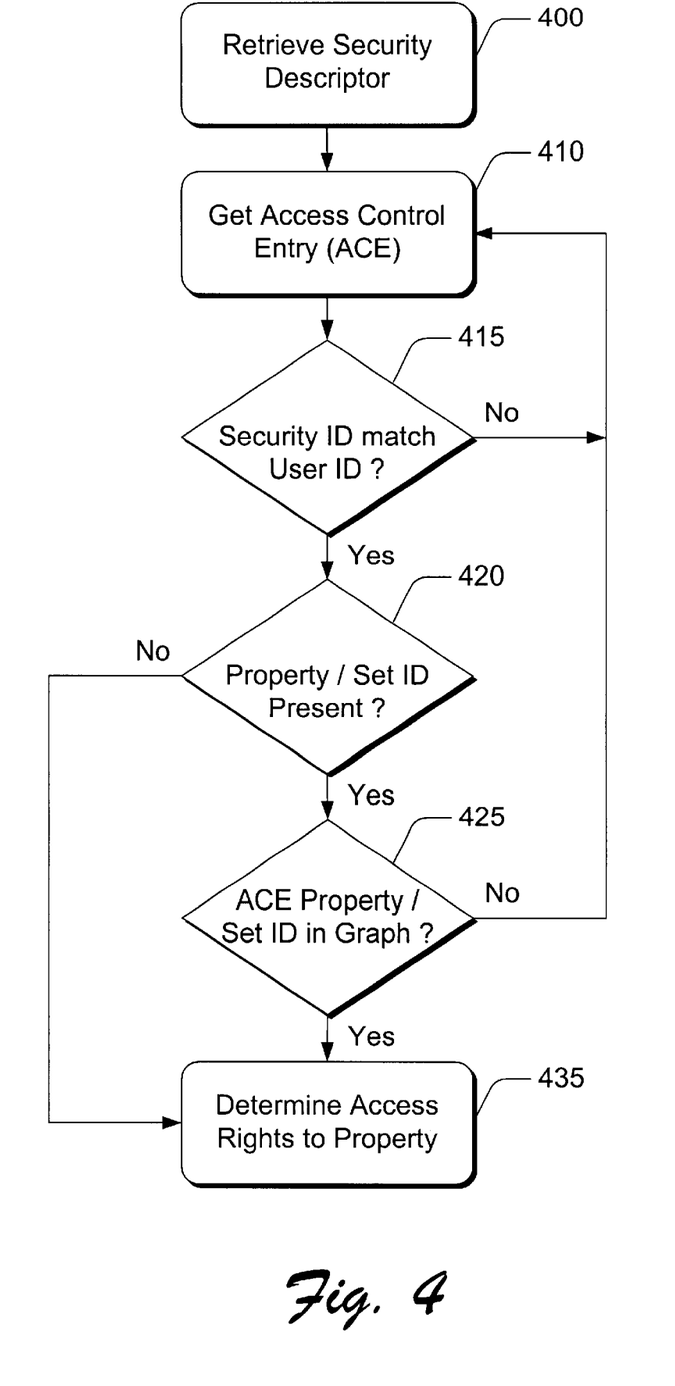
FIG. 4 shows a flowchart illustrating a method according to one embodiment of the invention.

In FIG. 4, a flowchart of a method according to one embodiment of the invention is shown. The method is invoked by a call to the "AccessCheckByType" function. The function call provides four parameters: an access token containing a USERID and a GROUPID; a security descriptor associated with an object; an optional graph of object identifiers, property set identifiers, and properties in the property sets that are associated with the object; and a desired access. The method begins at 400, where the security descriptor is retrieved from the parameters supplied to the function. If there are entries in the access control list in the security descriptor, the method proceeds to 410, which is the top of a loop that iterates through each entry in the access control list by retrieving the next unexamined access control entry.

Next, at 415 a check is made to determine if the USERID or the GROUPID in the access token passed to the function matches the security identifier in the current access control entry. If the identifiers do not match, the method proceeds to 410, to get the next entry in the access control list.

If the identifiers match, the method proceeds to 420, where the access control entry is examined to see if it contains a property identifier. If it does not contain such an identifier, the method determines that the bit mask and header in the current access control entry applies to each property in the object, and the method proceeds to 435 to determine the access rights to the property.

If the access control entry does contain a property identifier, the method proceeds to 425, where a check is made to determine if the property identifier matches one of the identifiers passed to the method as part of the graph. If there is a match at the root of the graph, then the bit mask and header in the current access control entry applies to each property in the object, and the method proceeds to 435. If there is a match for a property set identifier in the graph, then the bit mask and header in the current access control entry applies to each property in the set, and the method proceeds to 435. If there is a match on a specific property identifier, then the bit mask and header in the current access control entry applies to the specific property and the method proceeds to 435 to determine the access rights to the property. The process continues until the entire graph is exhausted. If there is no match on any identifier in the graph, the method proceeds to 410 to retrieve the next unexamined access control entry.

Finally, at 435 the method examines the header field and bit mask field of the current access control entry to set the access rights as indicated by 425. The bit mask field is compared to the desired access parameter to determine if the access control entry controls the desired permission. If it does, the header value determines whether the permission is granted or denied. If it is granted, an entry is added to a list of granted accesses. The associated object, property set and property identifiers are added to the second list to correspond to the access granted. This process continues until the desired access is granted on all identifiers in the graph or when no more access control entries remain in the access control list.

Conclusion

A system to provide access control to individual properties in an object has been described. Although specific embodiments have been illustrated and described herein, it will be appreciated by those of ordinary skill in the art that any arrangement which is calculated to achieve the same purpose may be substituted for the specific embodiments shown. For example, data fields defining certain aspects for the various data structures could be replaced with alternative representations providing the same function. Additionally, new service modules could be adapted to benefit from the advantages provided by the invention. For example, a database engine could be adapted in accordance with the invention to provide access control to individual columns of a database. This application is intended to cover any adaptations or variations of the present invention. Therefore, it is manifestly intended that this invention be limited only by the following claims and equivalents thereof.

We claim:

1. A computerized access control system, comprising:
   an operating system operative to control an application and a service running on a computer, the service maintaining a service object having at least a first property and a second property; and
   an access control module within the operating system, the access control module including an access control interface, and the access control module operative to provide a first permission to the first property and a second permission to the second property, wherein the first permission and the second permission include different access control rights.

2. The system of claim 1, wherein the service is a file system service or a directory service.

3. The system of claim 1, wherein the first and second properties are each assigned a unique identifier.

4. The system of claim 1, wherein the operating system is a version of the Windows NT operating system.

5. The system of claim 1, wherein the first property or the second property is a member of a set having common access control rights.

6. A method for controlling access by a software application to a property identified by a first property identifier in an object, the method comprising:
   determining a user identifier associated with the software application;
   retrieving an access control entry associated with the object, said access control entry having a second property identifier, a security identifier, an access right definition and an access right type; and
   comparing the first property identifier to the second property identifier and if the property identifiers are equal, checking if the user identifier equals the security identifier and if so, providing the access right definition and the access right type to the software application.

7. The method of claim 6, wherein the access right definition defines the right to read a property value or write a property value.

8. The method of claim 6, wherein the access right type indicates access to the property is allowed or denied.

9. The method of claim 6, further comprising checking if the property is a member of a set of related properties.

10. The method of claim 6, further comprising retrieving a security descriptor containing an access control list, said list referencing the access control entry.

11. A computer comprising:

a processor;

a computer-readable medium;

an operating system operative to control an application and a service running on a computer, the service maintaining a service object having at least a first property and a second property; and an access control module within the operating system, the access control module including an access control interface, and the access control module operative to provide a first permission to the first property and a second permission to the second property, wherein the first permission and the second permission include different access control rights.

12. The computer of claim 11, wherein the service is a file system service or a directory service.

13. The computer of claim 11, wherein the first property and the second property are each assigned a unique identifier.

14. The computer of claim 11, wherein the operating system is a version of the Windows NT operating system.

15. The computer of claim 11, wherein the first property is a member of a set having common access control rights.

16. A computer readable medium having computer-executable instructions for performing a method comprising:

determining a user identifier associated with a software application;

retrieving an access control entry associated with an object, the object having a property identified by a first property identifier, and the access control entry having a second property identifier, a security identifier, an access right definition, and an access right type; and comparing the first property identifier to the second property identifier and if the property identifiers are equal, checking if the user identifier equals the security identifier and if so, providing the access right definition and the access right type to the software application.

17. The medium of claim 16, wherein the access right definition defines the right to read a property value or write a property value.

18. The medium of claim 16, wherein the access right type indicates access to the property is allowed or denied.

19. The medium of claim 16, further comprising checking if the property is a member of a set of related properties.

20. The medium of claim 16, further comprising retrieving a security descriptor containing an access control list that references the access control entry.

21. A computer-readable medium having stored thereon a data structure comprising:

a first data field containing data specifying an access right type;

a second data field containing data specifying an access permission;

a third data field containing a first property identifier;

a fourth data field containing a security id, wherein during a predetermined data processing operation a data field in the column identified by the fourth data field is compared to a user identifier and if equal, data in the third field is compared to a second property identifier and if equal providing the data in the first and second fields to a software application.

22. A method of communicating between a software application process and an access control module, the method comprising:

issuing, by the software application a function call to a function having parameters comprising an access token having a user identifier, a security descriptor, and a desired access;

receiving by a validation module the function call and parsing the function call to retrieve the parameters; and issuing by the access control module an indicator signal indicating the status of the function call.

23. The method of claim 22, wherein the parameters further comprise a graph data structure relating a set of properties in an object.

24. A computerized access control system, comprising:

a component operative to control an application running on a computer, the application managing an object having at least a first property and a second property; and an access control module operative to provide a first permission to the first property and a second permission to the second property, wherein the first permission and the second permission allow different access control rights.

25. The system of claim 24, wherein the application is a file system service or a directory service.

26. The system of claim 24, wherein the first and second properties are each assigned a unique identifier.

27. The system of claim 24, wherein the component is a version of the Windows NT operating system.

28. The system of claim 24, wherein the first property or the second property is a member of a set having common access control rights.

29. A computer comprising:

a processor;

a computer-readable medium;

a component operative to control an application running on a computer, the application managing an object having at least a first property and a second property; and an access control module operative to provide a first permission to the first property and a second permission to the second property, wherein the first permission and the second permission allow different access control rights.

30. The computer of claim 29, wherein the application is a file system service or a directory service.

31. The computer of claim 29, wherein the first property and the second property are each assigned a unique identifier.

32. The computer of claim 29, wherein the component is a version of the Windows NT operating system.

33. The computer of claim 29, wherein the first property is a member of a set having common access control rights.

* * * * *

UNITED STATES PATENT AND TRADEMARK OFFICE
CERTIFICATE OF CORRECTION

PATENT NO. : 6,289,458 B1  Page 1 of 1
DATED : September 11, 2001
INVENTOR(S) : Praerit Garg et al.

It is certified that error appears in the above-identified patent and that said Letters Patent is hereby corrected as shown below:

Column 1,
Line 64, change "modem" to -- modern --.

Signed and Sealed this

Twelfth Day of March, 2002

Attest:

JAMES E. ROGAN
*Attesting Officer*    *Director of the United States Patent and Trademark Office*